US012395927B2

(12) United States Patent
Bok et al.

(10) Patent No.: US 12,395,927 B2
(45) Date of Patent: *Aug. 19, 2025

(54) SEAT BELT WIRELESS COMMUNICATION SYSTEM AND METHOD

(71) Applicants: Hyundai Motor Company, Seoul (KR); Kia Corporation, Seoul (KR); Samsong Industries, Ltd., Seoul (KR)

(72) Inventors: Chang Kyu Bok, Seoul (KR); Dong Ryul Shin, Busan (KR); Su Cheon Kim, Incheon (KR); Yong Chan Yoon, Seoul (KR); Man Seok Kim, Gyeongsangnam-do (KR)

(73) Assignees: Hyundai Motor Company, Seoul (KR); Kia Corporation, Seoul (KR); Samsong Industries, Ltd., Seoul (KR)

( * ) Notice: Subject to any disclaimer, the term of this patent is extended or adjusted under 35 U.S.C. 154(b) by 311 days.

This patent is subject to a terminal disclaimer.

(21) Appl. No.: 17/948,497

(22) Filed: Sep. 20, 2022

(65) Prior Publication Data

US 2023/0300740 A1    Sep. 21, 2023

(30) Foreign Application Priority Data

Mar. 17, 2022   (KR) .................. 10-2022-0033551

(51) Int. Cl.
*H04W 52/02*    (2009.01)
*B60R 16/023*   (2006.01)
(Continued)

(52) U.S. Cl.
CPC ......... *H04W 52/02* (2013.01); *B60R 16/0232* (2013.01); *H02J 50/001* (2020.01);
(Continued)

(58) Field of Classification Search
CPC ... H04W 52/02; H04W 4/48; H04W 52/0225; H04W 84/20; B60R 16/0232;
(Continued)

(56) References Cited

U.S. PATENT DOCUMENTS 8,289,145 B2    10/2012   Miller et al.
10,752,206 B2   8/2020    Tinoco et al.
(Continued)

FOREIGN PATENT DOCUMENTS

JP    2015-000592 A    1/2015
JP    2019-0001365 A   1/2019
(Continued)

OTHER PUBLICATIONS

Kim, Dongho, and Junho Yeo. "Dual-band long-range passive RFID tag antenna using an AMC ground plane." IEEE Transactions on Antennas and Propagation 60.6 (2012): 2620-2626. (Year: 2012).*

*Primary Examiner* — Alan D Hutchinson
(74) *Attorney, Agent, or Firm* — Fox Rothschild LLP

(57) ABSTRACT

A seat belt wireless communication system and method are provided. The system comprises a fastening detection means, provided for each seat of a vehicle, configured to detect whether a seat belt is fastened for each seat, a slave controller configured to wake up, through wireless communication with the vehicle, transmit a slave data signal comprising a buckle state detected by the fastening detection means through wireless communication, and switch to a sleep state after transmitting the slave data signal, a master controller configured to receive and store a slave data signal wirelessly transmitted from each slave controller, and transmit the stored slave data signal to a system controller of the vehicle, and a harvesting circuit unit configured to perform energy harvesting in a process in which the master controller is configured to wirelessly transmit a harvesting signal, and (Continued)

each slave controller is configured to receive the harvesting signal.

16 Claims, 7 Drawing Sheets

(51) Int. Cl.
  *B60R 16/033* (2006.01)
  *B60R 22/48* (2006.01)
  *H02J 50/00* (2016.01)
  *H04L 1/08* (2006.01)
  *H04L 1/16* (2023.01)

(52) U.S. Cl.
  CPC .................. *H04L 1/08* (2013.01); *H04L 1/16* (2013.01); *B60R 16/033* (2013.01); *B60R 22/48* (2013.01); *B60R 2022/4816* (2013.01)

(58) Field of Classification Search
  CPC .................. B60R 16/033; B60R 22/48; B60R 2022/4816; H02J 50/001; H04L 1/08; H04L 1/16; Y02D 30/70
  See application file for complete search history.

(56) References Cited

U.S. PATENT DOCUMENTS

| | | |
|---|---|---|
| 2005/0061568 A1 | 3/2005 | Schondorf et al. |
| 2013/0314223 A1* | 11/2013 | Masudaya ........... B60R 16/0232 340/457.1 |
| 2017/0140583 A1* | 5/2017 | Seibert .................... G06N 5/04 |
| 2019/0256041 A1 | 8/2019 | Tinoco et al. |
| 2021/0237681 A1* | 8/2021 | Cuddihy ................. B60R 22/48 |

FOREIGN PATENT DOCUMENTS

| | | |
|---|---|---|
| JP | 2019-043451 A | 3/2019 |
| JP | 6840039 B2 | 3/2021 |

* cited by examiner

SEAT BELT WIRELESS COMMUNICATION SYSTEM AND METHOD

CROSS-REFERENCE TO RELATED APPLICATION(S)

This application claims, under 35 U.S.C. § 119(a), the benefit of Korean Patent Application No. 10-2022-0033551, filed on Mar. 17, 2022, in the Korean Intellectual Property Office, the disclosure of which is incorporated herein by reference in its entirety.

BACKGROUND

Technical Field

Embodiments of the present disclosure relate to a seat belt wireless communication system and method for securing power required for wireless communication through energy harvesting while wirelessly connecting a seat belt provided for each seat and a vehicle and turning off power when wireless communication is unnecessary to reduce battery consumption.

Description of the Related Art

A seat belt reminder device (SBR) is a device that induces a passenger, sitting on a seat without wearing a seat belt, to wear the seat belt using a warning light or a warning sound when a vehicle is traveling at a certain speed or higher.

In conventional SBRs, a buckle and an integrated central control unit (ICU) are electrically connected through wiring such that, when a seat belt is fastened to the buckle, a buckle fastening signal is transmitted to the ICU, and the ICU is configured to communicate with a vehicle controller in order to notify the vehicle controller whether the seat belt is fastened. In this case, a seat belt reminder sensor and seat belt sensors are connected to the ICU through a wire in the vehicle seat.

In addition, as the number of various sensors, in addition to seat belt reminder sensor and seat belt sensors, has increased in recent years, the length, weight, and cost of a wire has increased, resulting in a problem in processing of wiring.

In particular, as the number of electric sensors in a vehicle seat increases, various sensors and an ICU that is configured to control the sensors to maintain a state in which they are always turned on are needed, causing a problem in that battery consumption of a vehicle increases.

The matters described as the background art above are only for improving the understanding of the background of the present disclosure and should not be taken as acknowledging that they correspond to the prior art already known to those of ordinary skill in the art.

SUMMARY

The present disclosure has been made in view of the above problems, and it is an object of the present disclosure to provide a seat belt wireless communication system and method which secure power required for wireless communication through energy harvesting while wirelessly connecting a seat belt, provided for each seat, and a vehicle, and turn off power when wireless communication is unnecessary, to reduce battery consumption.

In accordance with an aspect of the present disclosure, the above and other objects can be accomplished by the provision of a seat belt wireless communication system comprising a fastening detection means, provided for each seat of a vehicle, and configured to detect whether a seat belt is fastened for each seat, a slave controller, provided for each seat, configured to wake up through wireless communication with a vehicle, transmit a slave data signal comprising a buckle state detected by the fastening detection means through wireless communication, and switch to a sleep state after transmitting the slave data signal, a master controller, provided in the vehicle, configured to receive and store a slave data signal wirelessly transmitted from each slave controller and transmit the stored slave data signal to a system controller of the vehicle, and a harvesting circuit unit configured to perform energy harvesting in a process in which the master controller is configured to wirelessly transmit a harvesting signal, and each slave controller is configured to receive the wirelessly transmitted harvesting signal.

The slave controller in the sleep state may be configured to wirelessly receive a wake-up signal and switch to a wake-up state.

The wake-up signal may be configured to be received when ignition is on, when a buckle is fastened or released in an ignition-on state, when vibration of the vehicle is sensed by a vibration sensing means, and when a predetermined period has elapsed in the ignition-on state.

The slave controller may be configured to be initialized after receiving the wake-up signal, and, when initialization is successful, each slave controller may be configured to transmit a slave data signal.

The slave data signal related to the buckle state may be a signal related to a fastening state of the buckle and a failure state of the buckle.

The slave data signal may further comprise a signal related to a state of a battery built in the slave controller and a signal related to a failure state of each slave controller.

When the master controller receives the slave data signal, the slave controller may be configured to switch to the sleep state.

When the master controller receives the slave data signal, the master controller may be configured to wirelessly transmit an acknowledgement signal to the slave controller.

When a wake-up signal, received by the slave controller, is a wake-up signal reflecting an ignition-on state or a fastening state of a buckle, a wake-up signal transmission timer of the slave controller may be configured to be turned on, and then the slave controller may be configured to be switched to the sleep state.

When the master controller fails to receive the slave data signal, the slave controller may be configured to retransmit the slave data signal, and, when the number of retransmissions exceeds a predetermined number of times, the slave controller may be configured to switch to the sleep state.

The harvesting circuit unit may comprise a harvesting-only circuit configured to transmit or receive a harvesting signal between the master controller and the slave controller at all times and, may be configured to convert the harvesting signal into electrical energy, and a harvesting circuit may be configured to transmit or receive a harvesting signal between the master controller and the slave controller and convert the harvesting signal into electrical energy in a situation in which a slave data signal and an acknowledgement signal are not transmitted or received between the master controller and the slave controller.

The harvesting signals received by the harvesting-only circuit and the harvesting circuit may have different frequency bands, and the harvesting signal and the acknowledgment signal received by the harvesting circuit may have the same frequency band.

The seat belt wireless communication system may further comprise an antenna configured to receive two or more signals transmitted from the master controller, a first matching circuit, provided in the harvesting-only circuit, configured to receive a signal for only harvesting among signals received by the antenna, and a second matching circuit, provided in the harvesting circuit, configured to receive a signal for harvesting and wireless communication among the signals received by the antenna.

The seat belt wireless communication system may further comprise a charging unit configured to charge the battery by combining electrical energy converted through the harvesting-only circuit and electrical energy converted through the harvesting circuit, a receiver configured to receive the acknowledgment signal transmitted from the master controller through the harvesting circuit, and a switch means configured to control a signal received by the harvesting circuit to be selectively induced to the charging unit or the receiver.

A harvesting operation of the harvesting circuit may be configured to be stopped from immediately before the slave controller transmits the slave data signal to the master controller until the acknowledgment signal is transmitted from the master controller to the slave controller.

In accordance with another aspect of the present disclosure, there is provided a seat belt wireless communication method comprising a step in which each slave controller in a sleep state wakes up through wireless communication, a step in which each slave controller transmits a slave data signal comprising a buckle state signal detected by a fastening detection means provided for each seat through wireless communication, a step in which the slave controller switches to a sleep state after transmitting the slave data signal, a step in which a master controller receives and stores the slave data signal wirelessly transmitted from each slave controller and transmits the stored slave data signal to a system controller of a vehicle, and a step in which the master controller wirelessly transmits a harvesting signal, and each slave controller receives the wirelessly transmitted harvesting signal and performs energy harvesting in a process of receiving the harvesting signal.

In a further aspect, a vehicle is provided that comprises a seat belt wireless communication system as disclosed herein. For instance, a vehicle is provided that comprises a seat belt wireless communication system, the system comprising: a) a fastening detection means, provided for each seat of a vehicle, configured to detect whether a seat belt is fastened for each seat; b) a slave controller, provided for each seat, configured to: i) wake up through wireless communication with the vehicle; transmit a slave data signal comprising a buckle state detected by the fastening detection means through wireless communication; and ii) switch to a sleep state after transmitting the slave data signal; c) a master controller, provided in the vehicle, configured to: i) receive and store a slave data signal wirelessly transmitted from each slave controller; and ii) transmit the stored slave data signal to a system controller of the vehicle; and c) a harvesting circuit unit configured to perform energy harvesting in a process in which: i) the master controller is configured to wirelessly transmit a harvesting signal; and ii) each slave controller is configured to receive the harvesting signal.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
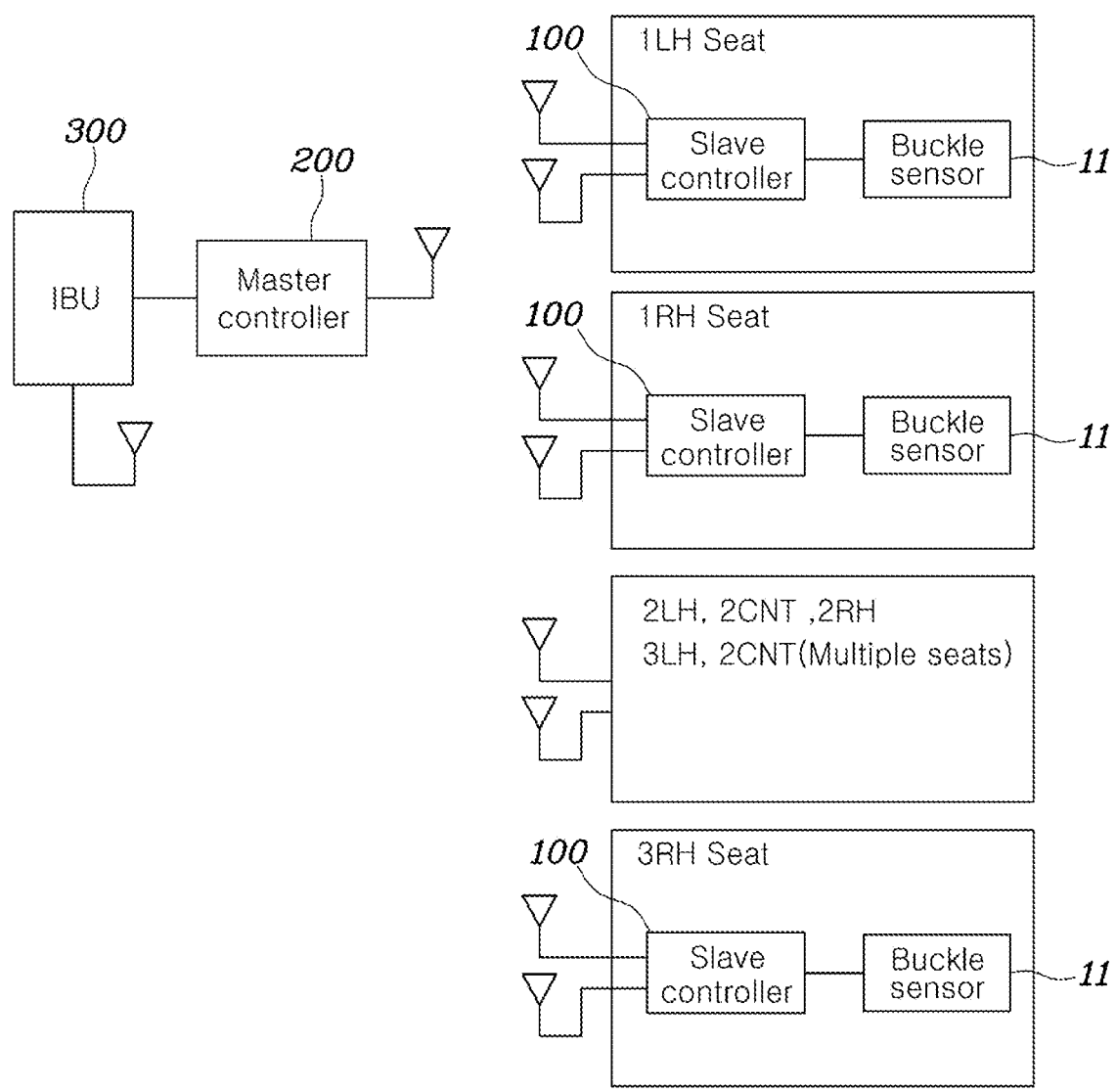
FIG. 1 is a diagram schematically showing a configuration of a seat belt wireless communication system according to the present disclosure.

Specific structural and functional descriptions of embodiments of the present disclosure disclosed in the present specification or application are illustrated for the purpose of describing embodiments according to the present disclosure, and embodiments according to the present disclosure may be implemented in various forms and should not be construed as being limited to the embodiments described in the present specification and application.

While embodiments according to the present disclosure are susceptible to various modifications and alternative forms, specific embodiments are shown by way of example in the drawings. However, the present disclosure should not be construed as limited to the embodiments set forth herein, but on the contrary, the present disclosure is to cover all modifications, equivalents, and alternatives falling within the spirit and scope of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The terms "first" and/or "second" are used to describe various components, but such components are not limited by these terms. The terms are used to discriminate one component from another component. For example, a first component may be called a second component and the second component may be called the first component within the technical spirit of the present disclosure.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components. Further, other representations describing a relationship between components, that is, "between", "immediately between", "adjacent to" and "directly adjacent to" should be construed likewise.

The terms used in the specification of the present disclosure are merely used in order to describe particular embodiments, and are not intended to limit the scope of the present disclosure. An element described in the singular form is intended to include a plurality of elements unless the context clearly indicates otherwise. In the specification of the present disclosure, it will be further understood that the term "comprise" or "include" specifies the presence of a stated feature, figure, step, operation, component, part or a combination thereof, but does not preclude the presence or addition of one or more other features, figures, steps, operations, components, or combinations thereof.

All the terms that are technical, scientific or otherwise agree with the meanings as understood by a person skilled in the art unless defined to the contrary. Common terms as found in dictionaries should be interpreted in the context of the related technical writings not too ideally or impractically unless expressly disclosed herein.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

A controller (a slave controller 100, a master controller 200, a system controller 300, and the like which will be described later) according to an exemplary embodiment of the present disclosure may be realized by a non-volatile memory (not shown) configured to store an algorithm configured to control operations of various components of a vehicle or data related to software instructions for executing the algorithm, and a processor (not shown) configured to perform operations described below using data stored in the memory. Here, the memory and the processor may be implemented as separate chips. Alternatively, the memory and the processor may be integrated and implemented as a single chip. The processor may take the form of one or more processors.

A preferred embodiment of the present disclosure will be described in detail with reference to the accompanying drawings.

Figure 2:
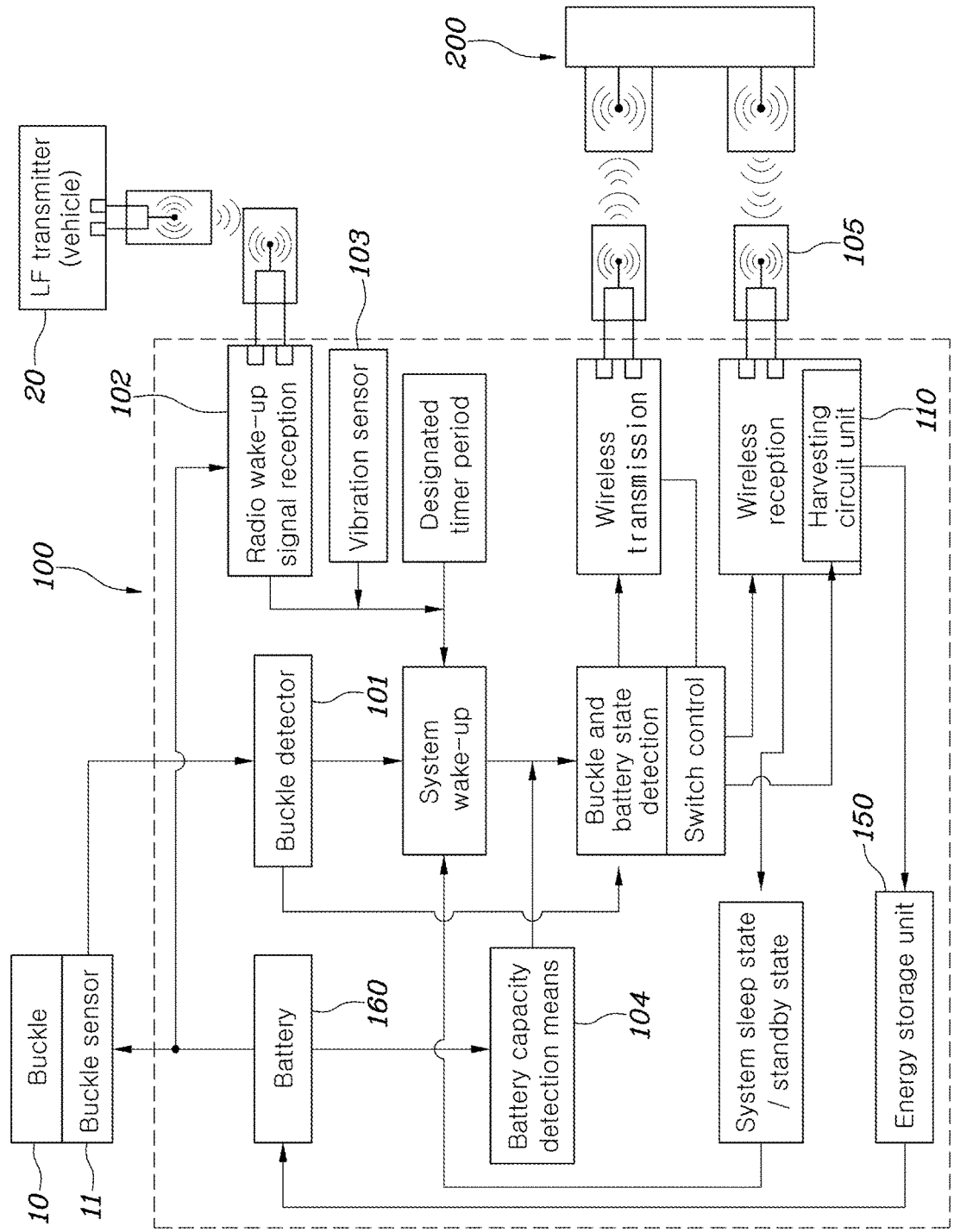
FIG. 2 is a diagram for describing configurations and operations of a slave controller and a harvesting circuit unit in the seat belt wireless communication system according to the present disclosure.
Figure 3:
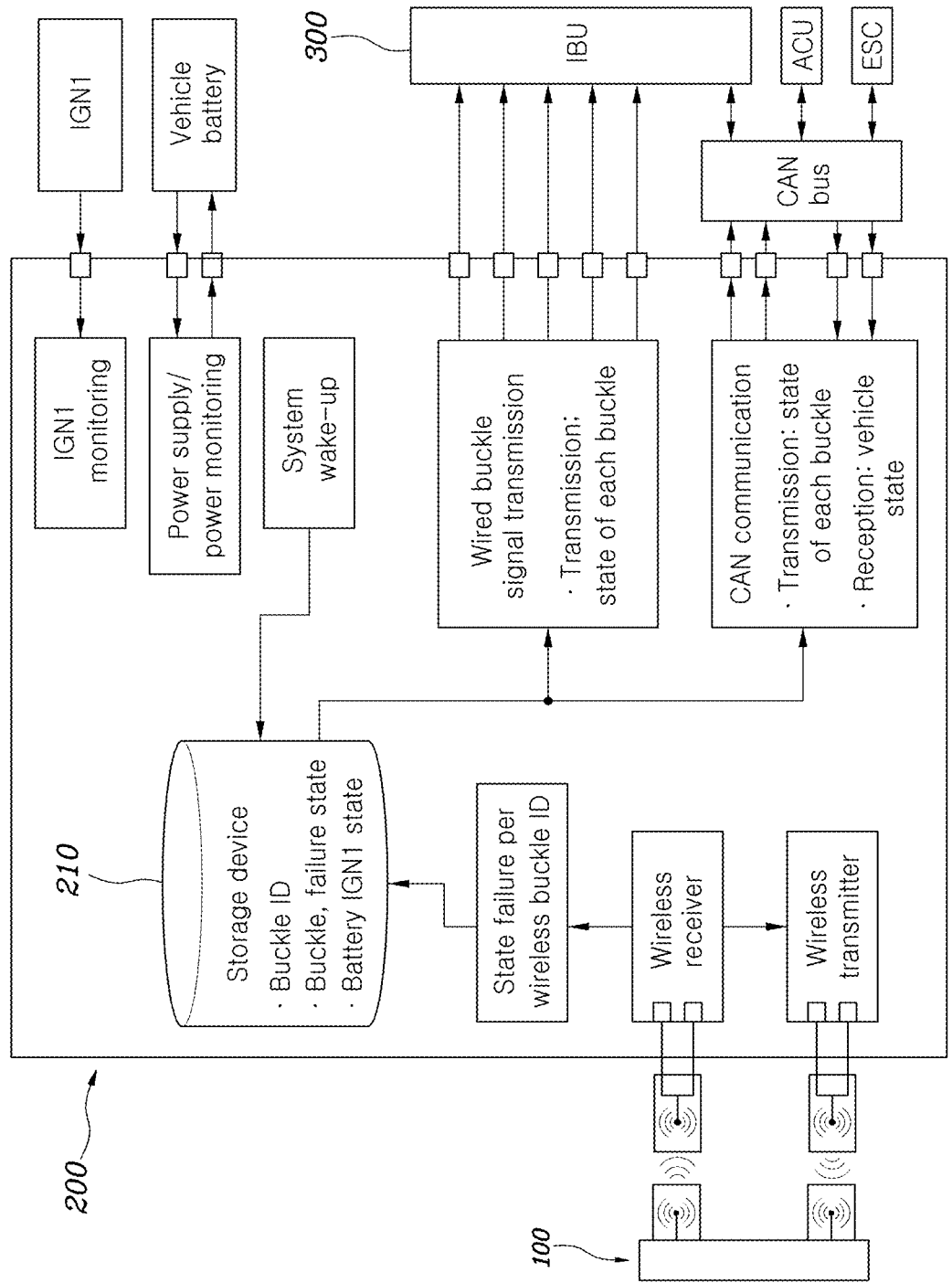
FIG. 3 is a diagram for describing a configuration and operation of a master controller in the seat belt wireless communication system according to the present disclosure.

FIG. 1 is a diagram schematically showing a configuration of a seat belt wireless communication system according to the present disclosure, FIG. 2 is a diagram for describing configurations and operations of a slave controller 100 and a harvesting circuit unit 110 in the seat belt wireless communication system according to the present disclosure, and FIG. 3 is a diagram for describing a configuration and operation of a master controller 200 in the seat belt wireless communication system according to the present disclosure.

Referring to the drawings, the seat belt wireless communication system according to the present disclosure comprises: a fastening detection means provided for each seat and detecting whether a seat belt is fastened; the slave controller 100 that is provided for each seat, wakes up through wireless communication with a vehicle, transmits a slave data signal comprising a buckle state detected by the fastening detection means through wireless communication, and switches to a sleep state after transmitting the slave data signal; the master controller 200 that is provided in the vehicle, receives and stores the slave data signal wirelessly transmitted from each slave controller 100, and transmits the stored slave data signal to a system controller 300 of the vehicle; and a harvesting circuit unit 110 that performs energy harvesting in a harvesting signal reception process in which the master controller 200 transmits a harvesting signal through wireless communication and each slave controller 100 receives the wirelessly transmitted harvesting signal.

The fastening detection means may be for detecting whether a buckle 10 is fastened, and comprises a buckle sensor 11 and a buckle detector 101.

For example, the buckle sensor 11 may be mounted on the buckle 10. Accordingly, when a tongue of a seat belt is fastened to the buckle 10, the buckle sensor 11 detects the fastening state of the tongue. For reference, the buckle sensor 11 may detect whether the tongue is fastened using an internal contact point of the buckle 10 or a Hall sensor method.

The buckle detector 101 may be provided in the slave controller 100 and may be connected to the buckle sensor 11 through wireless communication.

That is, when the tongue is fastened to the buckle 10, the buckle sensor 11 may be configured to sense the fastening state and transmit a fastening signal to the buckle detector 101. When the tongue is released from the buckle 10, the buckle sensor 11 may be configured to sense the buckle release state and transmit a release signal to the buckle detector 101, thereby detecting a wearing state of the seat belt.

In addition, each slave controller 100 may be configured to receive a wake-up signal wirelessly transmitted from the vehicle in the sleep state and may be converted to a wake-up state.

In addition, each slave controller 100 may be configured to detect the fastening state of the seat belt based on a signal detected through the fastening detection means.

Further, each slave controller 100 may be configured to wirelessly transmit a slave data signal related to a seat belt fastening state in an individual seat to the master controller 200, and after transmission is completed, may be configured to enter a sleep state.

Here, the sleep state refers to a state in which power supplied to the slave controller 100 is cut off and thus the slave controller 100 does not operate.

However, even in the sleep state, wireless energy harvesting, which will be described later, operates, and thus electrical energy can be charged.

The master controller 200 may be configured to receive the slave data signal wirelessly transmitted from each slave controller 100 and may be configured to diagnose a buckle fastening state based on the received slave data signal.

Specifically, the master controller 200 may be configured to enter a wake-up state when ignition is on or a door is opened and enter a sleep state when ignition is off or a door is closed after the ignition is off.

Accordingly, in the wake-up state of the master controller 200, an ID is designated for each buckle 10, and a slave data signal wirelessly transmitted for the ID of each buckle 10 may be received and stored in a storage device 210.

In addition, received vehicle battery information and ignition information may also be stored in the storage device 210.

For wireless communication between the master controller 200 and the slave controller 100 and energy harvesting, Bluetooth low energy (BLE) of a radio frequency (RF) of 2.4 GHz band may be used, but other low-power radio frequencies (315, 433, and 425 to 435 MHz) may also be used.

In addition, two frequency signals having different frequency bands may be used for constant energy harvesting along with wireless communication. This will be described below.

In addition, the master controller 200 may be configured to transmit buckle state information to the system controller 300 of the vehicle through CAN communication and may be configured to receive vehicle state information (signals related to ignition on state, driving state, stop state, and parking state) from the system controller 300. Here, the system controller 300 may be a vehicle controller such as an integrated body unit (IBU), an airbag control unit (ACU), or an electronic stability controller (ESC).

However, state information of the buckle 10 provided by the master controller 200 to the system controller 300 may be configured to be provided through a wire.

In addition, the harvesting circuit unit 110 is provided in each slave controller 100, and when a harvesting signal is transmitted from the master controller 200, the harvesting circuit unit 110 provided in each slave controller 100 may be configured to receive the harvesting signal.

In addition, the harvesting circuit unit 110 may be configured to convert the harvesting signal into electrical energy, and a battery 160 may be configured to be charged by the converted electrical energy.

That is, since about 70% of vehicle operation is parking and thus the battery 160 is continuously discharged naturally, it is advantageous to continuously charge the battery even with weak power.

Accordingly, the present disclosure wirelessly connects the slave controller 100 provided for each sheet and the single master controller 200 provided in the vehicle such that the harvesting signal wirelessly transmitted from the master controller 200 is converted into electrical energy through the harvesting circuit unit 110.

Accordingly, power required for wireless communication is stably secured by continuously generating power and charging the battery 160 irrespective of the operation of a seat belt.

Moreover, when wireless communication between the slave controller 100 and the master controller 200 is unnecessary as the slave controller 100 and the master controller 200 may be connected through wireless communication to perform a seat belt reminder function, consumption of the battery 160 that supplies power to the slave controller 100 may be considerably reduced by cutting off power flowing into the slave controller 100 through transition of the slave controller 100 into a sleep state.

For reference, the present disclosure may be configured to warn of a seat belt non-wear state using lighting, sound (warning sound or warning voice), tactile sense (seat vibration or seat belt vibration), etc. when the seat belt non-wear state is detected.

As shown in FIG. 2, in the present disclosure, the slave controller 100 in a sleep state may be configured to wirelessly receive a wakeup signal and switch to a wake-up state.

At this time, the wake-up signal may be received when the ignition is on, when the buckle 10 is fastened or unfastened in an ignition-on state, when vibration of the vehicle is sensed by a vibration sensing means, and when a certain period has elapsed in the ignition-on state.

For example, when the ignition of the vehicle is turned on, the slave controller 100 may receive the wake-up signal from the vehicle.

At this time, the wake-up signal may be transmitted through a low frequency (RF: 125 kHz) transmitter 20, which is a low-frequency signal transmission device in the vehicle, and the slave controller 100 may be provided with an LF receiver 102 to receive the wake-up signal.

When an event of fastening the buckle 10 or releasing the fastened buckle 10 occurs while the ignition of the vehicle is turned on, the wake-up signal may be received from the buckle detector 101 to wake up the slave controller 100.

In addition, when vibration of a predetermined value or more is detected through a vibration sensor 103 installed in the vehicle, the wake-up signal may be received to wake up the slave controller 100.

In addition, when a timer period stored in advance in the slave controller 100 is reached while the ignition of the vehicle is turned on, the wake-up signal may be received.

Further, in the present disclosure, the slave controller 100 may be configured to be initialized upon reception of the wake-up signal, and when initialization is successful, each slave controller 100 may transmit a slave data signal.

That is, when the slave controller 100 receives the wake-up signal, initialization is performed in the sleep state of the slave controller 100, and device driving, RAM test, flash test, and the like are performed through initialization. Upon successful initialization of the slave controller 100, the slave controller 100 enters a slave data signal transmission ready state and then transmits a slave data signal.

In addition, a slave data signal for the buckle state may be a signal related to a fastening state of the buckle 10 or a failure state of the buckle 10.

In addition, the slave data signal may further comprise a signal for a state of the battery 160 included in the slave controller 100 and a signal for a failure state of each slave controller 100.

For example, the battery 160 is built-in for each slave controller 100, and the battery 160 may be a coin battery.

Specifically, when the slave controller 100 enters the slave data signal transmission ready state after initialization of the slave controller 100, it may be determined whether the buckle 10 is fastened, the state of the battery 160, and whether the slave controller 100 has failed.

Here, the state of the battery 160 is the capacity of the battery 160, and the capacity of the battery 160 may be detected through a battery capacity detection means 104. That is, a power state and a low voltage state of the battery 160 are detected through the battery capacity detection means 104, and when the capacity of the battery 160 is less than a specific limit capacity, a signal comprising a battery change notification may be transmitted.

In the present disclosure, when the master controller 200 normally receives a slave data signal transmitted by the slave controller 100, the slave controller 100 can be switched to the sleep state.

For example, the slave controller 100 may be configured to generate a slave data signal, which is information related to a fastening state of the buckle 10, a state of the battery 160, and a failure state of the slave controller 100, in a message packet format and transmits the slave data signal to the master controller 200 using wireless communication (RF: Bluetooth).

Accordingly, when the master controller 200 normally receives the message and thus transmission of the message is completed, the slave controller 100 may be configured to be switched to the sleep state such that power flowing into the slave controller 100 in a situation where wireless communication is not used is cut off, thereby reducing consumption of the battery 160.

In addition, when the master controller 200 normally receives the slave data signal transmitted by the slave controller 100, the master controller 200 may be configured to wirelessly transmit an acknowledgement signal to the slave controller 100.

For example, when the master controller 200 normally receives a message from the slave controller 100, the master controller 200 may be configured to transmit an acknowledgement signal indicating that the message transmitted by the slave controller 100 has been correctly transmitted, and the slave controller 100 may be configured to receive the acknowledgement signal transmitted from the master controller 200.

In addition, when a wake-up signal received by the slave controller 100 is a wake-up signal indicating an ignition on state or a fastening state of the buckle 10, a wake-up signal transmission timer of the slave controller 100 may be turned on, and then the slave controller 100 may be switched to the sleep state.

For example, when a wake-up signal that wakes up the slave controller 100 is a wake-up signal that reflects a starting state of the vehicle or a fastening state of a seat belt, the wake-up signal transmission timer is turned on in order to periodically check whether the buckle 10 is fastened.

Accordingly, after switching to the sleep state, even if an event due to ignition on or fastening of the buckle 10 does not occur, a wake-up signal is transmitted to the slave controller 100 at intervals determined by the timer, and thus a buckle state and a battery state can be checked periodically.

On the other hand, in the present disclosure, when the master controller 200 does not normally receive the slave data signal, the slave controller 100 may retransmit the slave data signal, and when the number of retransmissions exceeds a predetermined number of times, the slave controller 100 may be switched to the sleep state.

For example, when the master controller 200 fails to normally receive the message transmitted from the slave controller 100 and thus the master controller 200 cannot transmit an acknowledgement signal to the slave controller 100, the slave controller 100 fails to receive the acknowledgement signal and thus the slave controller 100 knows that message transmission has failed and accordingly retransmits the message.

The slave controller 100 may be configured to attempt retransmission of the message a predetermined number of times, and when the number of retransmissions exceeds the predetermined number, message transmission failure may be recorded.

Here, when message transmission of a specific slave controller 100 fails, it may be diagnosed as failure of the corresponding slave controller 100, and when wireless transmission and reception between the respective slave controllers 100 and the master controller 200 all fail, it may be diagnosed as an abnormality in wireless transmission and reception, or the like.

Then, when the number of message retransmissions exceeds the predetermined number of times, the slave controller 100 may be controlled to be switched to the sleep state.

In this way, even when the number of message retransmissions exceeds the predetermined number of times and thus message retransmission has failed, power flowing into the slave controller 100 is cut off in a situation in which wireless communication is not used by switching the slave controller 100 to the sleep state. Accordingly, consumption of the battery 160 is reduced.

Figure 4:
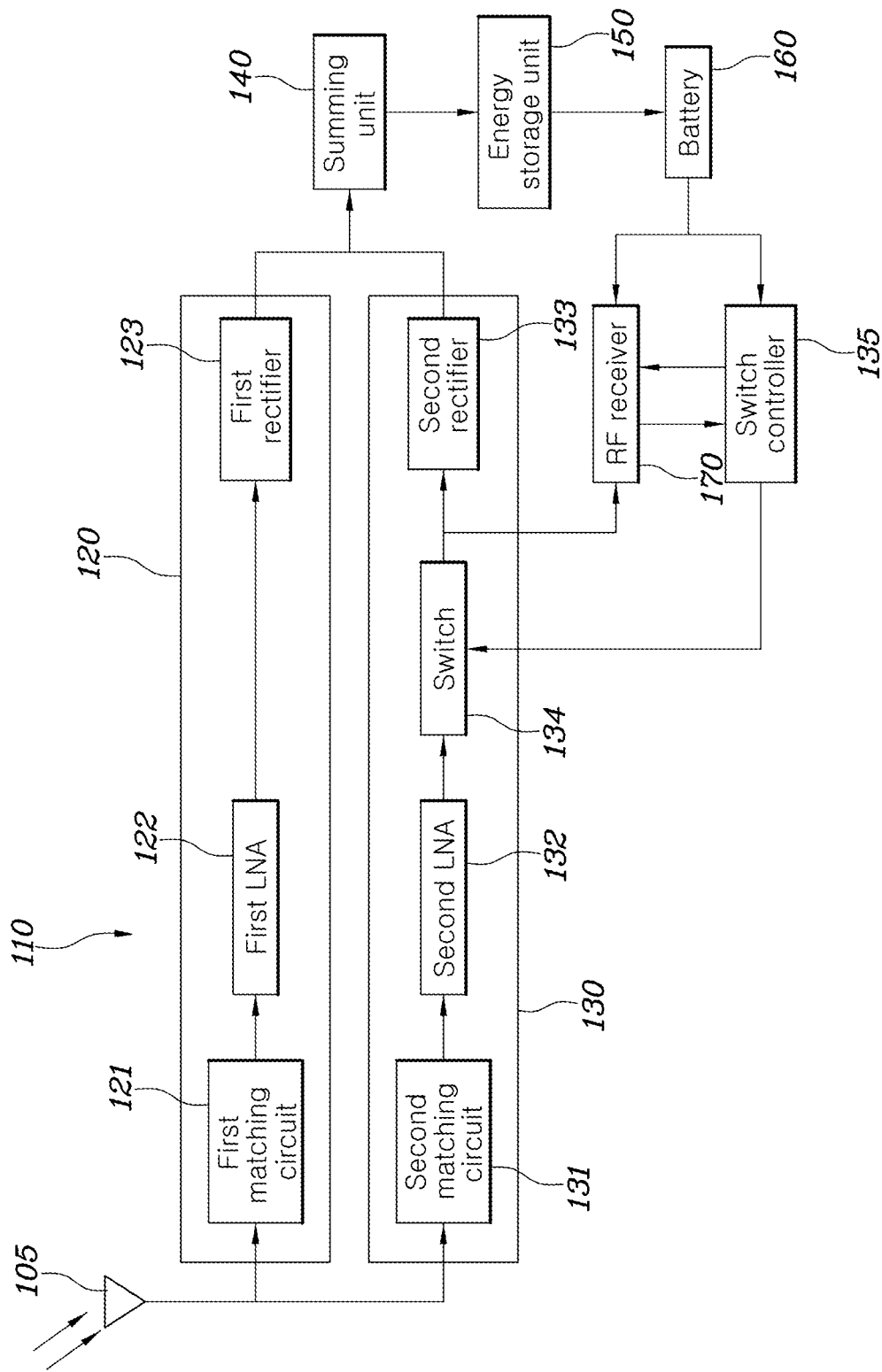
FIG. 4 is a diagram illustrating components constituting a harvesting means according to the present disclosure in detail.

FIG. 4 is a diagram illustrating components constituting a harvesting means according to the present disclosure in detail.

Referring to FIG. 4, the harvesting circuit unit 110 comprises: a harvesting-only circuit 120 that transmits and receives a harvesting signal between the master controller 200 and the slave controller 100 at all times and converts the harvesting signal into electrical energy; and a harvesting circuit 130 that transmits and receives a harvesting signal between the master controller 200 and the slave controller 100 in a situation in which a slave data signal and an acknowledgement signal are not transmitted/received between the master controller 200 and the slave controller 100 and converts the harvesting signal into electrical energy.

Specifically, the harvesting circuit unit 110 may be provided with the harvesting-only circuit 120 and the harvesting circuit 130. Accordingly, the harvesting-only circuit 120 may be configured to receive a harvesting signal transmitted from the master controller 200 and may be configured to convert the same into electrical energy at all times.

However, the harvesting circuit 130 may be configured to receive the harvesting signal transmitted from the master controller 200 and converts the same into electrical energy, but harvesting operation is stopped when a slave data signal from the slave controller 100 and an acknowledgement signal from the master controller 200 are transmitted and received.

Accordingly, while the battery 160 is continuously charged by the harvesting-only circuit 120, charging of the battery 160 may be stopped only during a short time for which wireless communication is performed between the master controller 200 and the slave controller 100 and charging of the battery 160 may be performed through the harvesting circuit 130 during the remaining time. Accordingly, the efficiency of energy harvesting may be maximized.

In addition, in the present disclosure, harvesting signals received by the harvesting-only circuit 120 and the harvesting circuit 130 have different frequency bands, and the harvesting signal and the acknowledgment signal received by the harvesting circuit 130 have the same frequency band.

For example, frequency bands in which energy can be obtained, that is, 4G, 5G, 800 MHz to 900 MHz, and the like are applicable to the harvesting signal received by the harvesting-only circuit 120.

In addition, frequency bands in which energy can be obtained as well as Bluetooth communication, for example, Bluetooth in 2.4 GHz band, Zigbee, Wi-Fi, RF (433 MHz), and the like are applicable to the harvesting signal and the acknowledgment signal received by the harvesting circuit 130.

In addition, the harvesting circuit unit 110 of the present disclosure may further comprise: an antenna 105 for receiving two or more signals transmitted from the master controller 200; a first matching circuit 121 provided in the harvesting-only circuit 120 and receiving a signal for only harvesting among signals received by the antenna 105; and a second matching circuit 131 provided in the harvesting circuit 130 and receiving signals for harvesting and wireless communication among signals received by the antenna 105.

Specifically, the antenna 105 may be provided in each slave controller 100 and may be configured to receive two frequency signals having different frequency bands.

In addition, the harvesting-only circuit 120 may comprise the first matching circuit 121, a first low noise amplifier (LNA) 122, and a first rectifier 123.

Accordingly, two frequency signals may be received through the antenna 105, and a frequency signal (e.g., 4G, 5G, 800 MHz to 900 MHz or the like) for only harvesting between the two frequency signals is matched through the first matching circuit 121 (matching network).

The first LNA 122 amplifies the received low-frequency signal, and the first rectifier 123 converts alternating current that has passed through the first LNA 122 into direct current.

The harvesting circuit 130 comprises the second matching circuit 131, a second LNA 132, a switch 134, and a second rectifier 133.

Accordingly, two frequency signals are received through the antenna 105, and a frequency signal (e.g., Bluetooth in 2.4 GHz band, Zigbee, Wi-Fi, RF (433 MHz) or the like) for harvesting and wireless communication between the two frequency signals is matched through the second matching circuit 131 (matching network).

In addition, the second LNA 132 amplifies the received low-frequency signal, and the second rectifier 133 converts alternating current that has passed through the second LNA 132 into direct current. The switch 134 is a component comprised in a switch means, which will be described below.

In addition, the present disclosure may comprise: a charging unit for charging the battery 160 by combining electrical energy converted through the harvesting-only circuit 120 and electrical energy converted through the harvesting circuit 130; a receiver 170 for receiving an acknowledgement signal transmitted from the master controller 200 through the harvesting circuit 130; and a switch means for controlling the signal received by the harvesting circuit 130 to be selectively guided to the charging unit or the receiver 170.

Specifically, the charging unit may be composed of a summing unit 140 and an energy storage unit 150. The direct currents rectified through the first rectifier 123 and the second rectifier 133 may be summed in the summing unit 140, and the summed electrical energy is temporarily stored in the energy storage unit 150. The energy storage unit 150 may be a capacitor or a supercapacitor capable of quickly storing low power.

The switch means may comprise the switch 134 and a switch controller 135, and controls the operation of the switch 134 through the switch controller 135.

That is, the switch 134 may be controlled to induce a frequency signal that has passed through the second LNA 132 to the second rectifier 133 in a situation in which harvesting is performed through the harvesting circuit 130, and the switch 134 is controlled to induce the frequency signal that has passed through the second LNA 132 to the receiver 170 in a situation in which wireless transmission and reception of a slave data signal and an acknowledgment signal are performed through the harvesting circuit 130.

In addition, harvesting operation of the harvesting circuit 130 may be stopped from immediately before the slave controller 100 transmits the slave data signal to the master controller 200 until the acknowledgment signal is transmitted from the master controller 200 to the slave controller 100.

That is, before the slave controller 100 transmits the slave data signal, the harvesting circuit 130 may be configured to stop harvesting by blocking signal transmission to the second rectifier 133 by controlling the switch 134. When an acknowledgment signal is transmitted from the master controller 200 to the receiver 170 of the slave controller 100 through the harvesting circuit 130, signal transmission to the second rectifier 133 is allowed, thereby performing harvesting.

Figure 5:
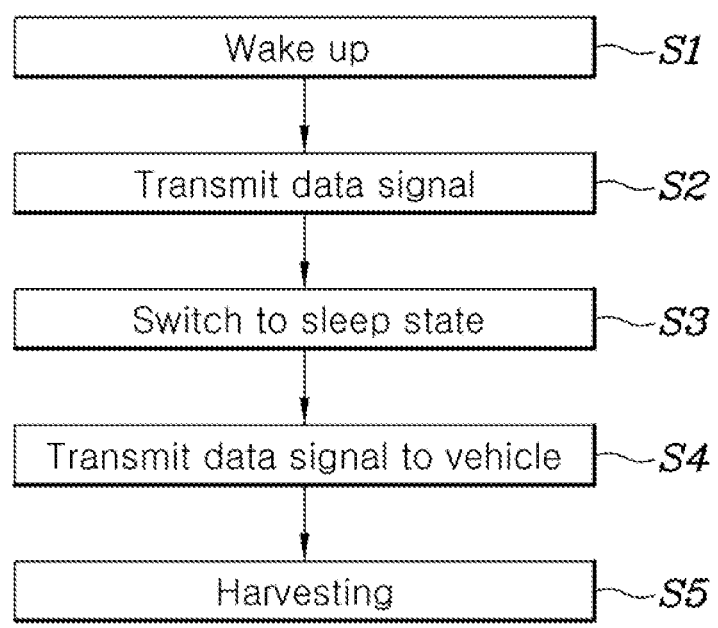
FIG. 5 is a diagram showing steps of a seat belt wireless communication method according to the present disclosure.
Figure 6:
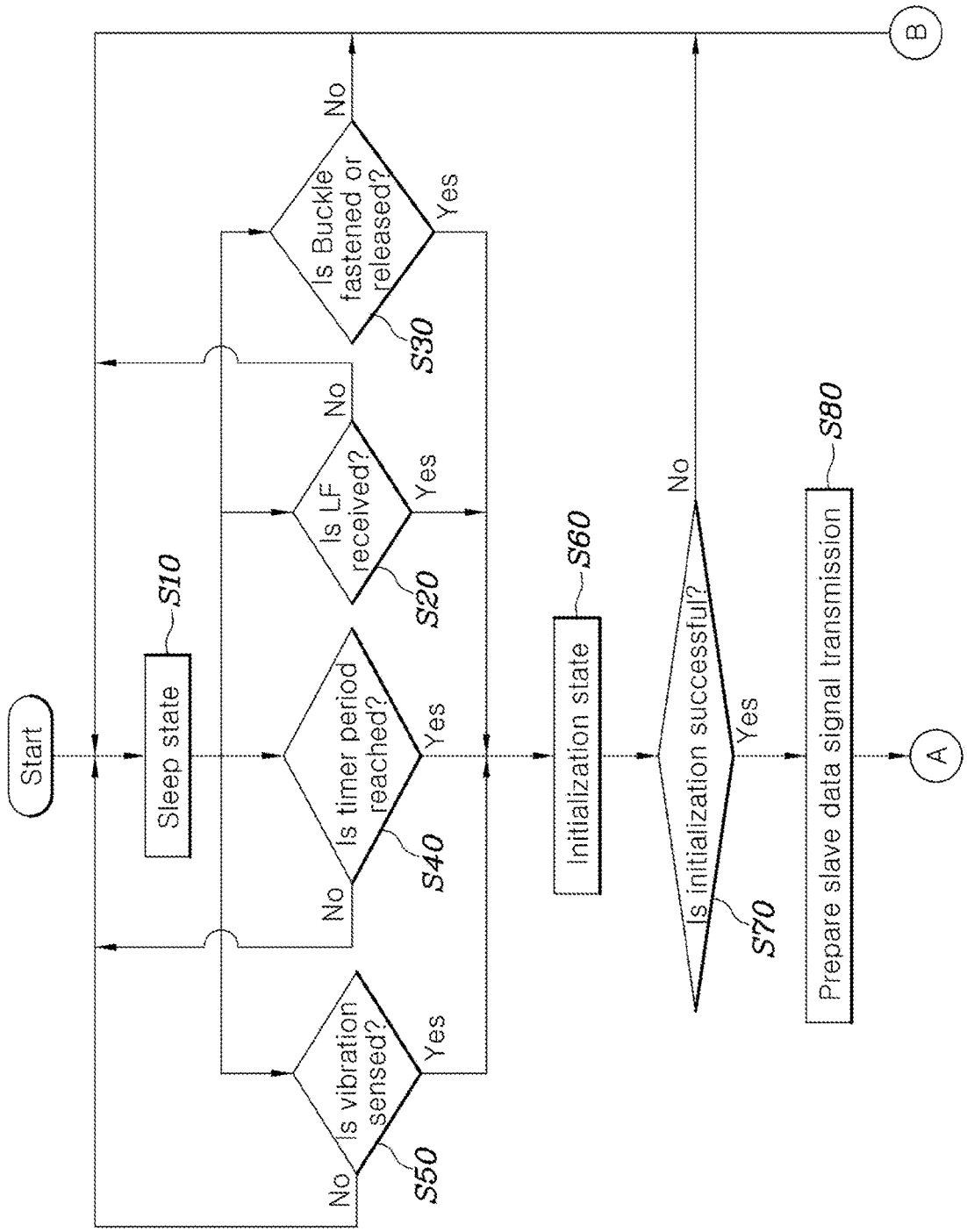
FIGS. 6 and 7 are flowcharts showing a seat belt wireless communication process according to the present disclosure.
Figure 7:
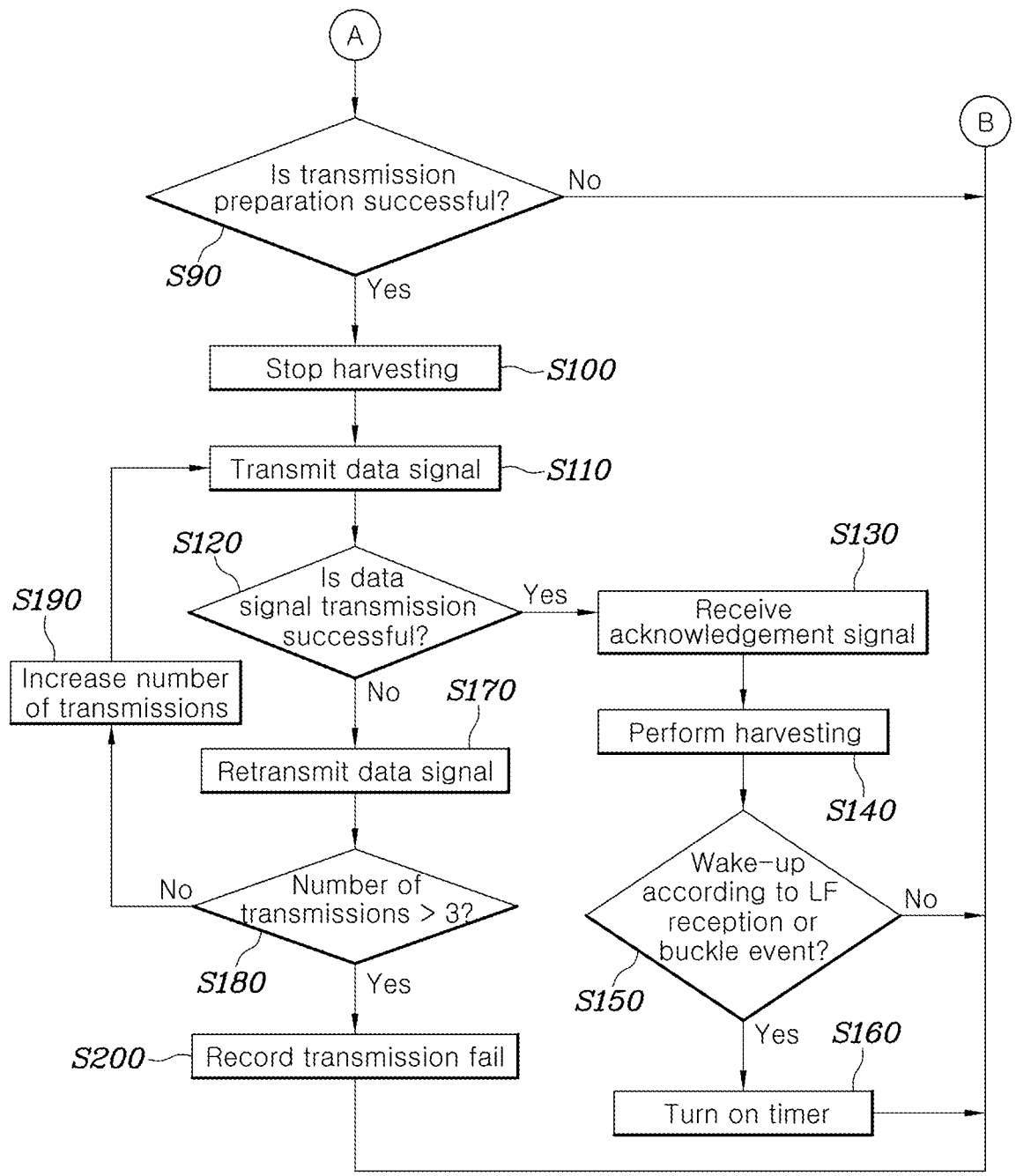

FIG. 5 is a diagram illustrating steps of a seat belt wireless communication method according to the present disclosure, and FIGS. 6 and 7 are flowcharts showing a seat belt wireless communication process according to the present disclosure.

Referring to the drawings, the seat belt wireless communication method according to the present disclosure comprises: a step S1 in which each slave controller 100 in a sleep state wakes up through wireless communication; a step S2 in which each slave controller 100 transmits a slave data signal comprising a buckle state signal detected by a fastening detection means provided for each seat through wireless communication; a step S3 in which the slave controller 100 is switched to the sleep state after transmitting the slave data signal; a step S4 in which the master controller 200 receives and stores the slave data signal wirelessly transmitted from each slave controller 100, and transmits the stored slave data signal to the system controller 300 of the vehicle; a step S5 in which the master controller 200 wirelessly transmits a harvesting signal, and each slave controller 100 receives the wirelessly transmitted harvesting signal and performs energy harvesting in the process of receiving the harvesting signal.

The seat belt wireless communication process according to the present disclosure will be described below with reference to FIGS. 6 and 7.

It is monitored whether a wake-up signal is received by the slave controller 100 in a sleep state (S10).

For example, it is monitored whether an LF signal according to ignition on is received from the vehicle, a buckle fastening or release signal is received, vibration of the vehicle of a certain level or more is generated, or a preset timer period is reached (S20, S30, S40, and S50).

If any one of the above conditions is satisfied, each slave controller 100 receives a wake-up signal from the vehicle, and an initialization process is performed in the sleep state of the slave controller 100 upon reception of the wake-up signal (S60).

Subsequently, it is determined whether initialization of the slave controller 100 is successful (S70), and if initialization is successful, a slave data signal related to a seat belt fastening state, a battery state, and a failure state of the slave controller 100 is generated in a message packet format and prepared to be transmitted after initialization (S80).

Next, when message transmission preparation is completed (S90), harvesting using the harvesting circuit 130 is temporarily stopped by controlling the switch 134 of the harvesting circuit 130 to block signal transmission to the second rectifier 133 (S100).

For reference, although not shown in the figure, harvesting is performed at all times through the harvesting-only circuit 120 to charge the battery 160.

Then, each slave controller 100 transmits a message (S110), and it is determined whether the transmitted message is normally received by the master controller 200 (S120).

When the master controller 200 normally receives data transmitted by the slave controller 100 as a result of determination in S120, the master controller 200 transmits an acknowledgement signal indicating that the slave data signal transmitted from the slave controller 100 has been correctly received to the slave controller 100, and the slave controller 100 receives the acknowledgment signal (S130).

Upon reception of the acknowledgement signal, the slave controller 100 performs harvesting by adjusting the switch 134 of the harvesting circuit 130 to allow signal transmission to the second rectifier 133, and thus the battery 160 is charged (S140).

After S140, a wake-up signal representing transition from the sleep state to a wake-up state is determined (S150).

As a result of determination of S150, if the wake-up signal is switched to a signal representing a fastening or release state of the buckle 10 or is a wake-up signal according to wireless transmission/reception of an LF signal, the timer is turned on (S160), and then the slave controller 100 is switched to the sleep state (S120). In the case of other wake-up signals, the slave controller 100 is immediately switched to the sleep state.

On the other hand, if it is determined in S120 that the message is not normally received, the slave controller 100 retransmits the message (S170).

Then, it is determined whether the number of retransmissions due to normal message transmission failure exceeds 3 (S180), and if it is equal to or less than 3, the number of transmissions is counted and accumulated (S190). If the number of retransmissions exceeds 3, message transmission failure is recorded (S200), and then the slave controller 100 is switched to the sleep state.

As described above, the present disclosure wirelessly connects the slave controller 100 provided for each seat and the single master controller 200 provided in the vehicle such that a harvesting signal wirelessly transmitted from the master controller 200 is converted into electrical energy through harvesting circuit unit 110. Accordingly, power required for wireless communication is stably secured by continuously generating power and charging the battery 160 irrespective of the operation of a seat belt.

Moreover, since the slave controller 100 and the master controller 200 are connected through wireless communication to perform the seat belt reminder function, power flowing into the slave controller 100 is cut off through transition of the slave controller 100 to the sleep state when wireless communication between the slave controller 100 and the master controller 200 is unnecessary, and thus consumption of the battery 160 that supplies power to the slave controller 100 is considerably reduced.

Although the present disclosure has been described in detail only with respect to the specific examples described above, it is obvious to those skilled in the art that various modifications and variations are possible within the scope of the technical spirit of the present disclosure, and it is apparent that such modifications and variations belong to the appended claims.

What is claimed is:

1. A seat belt wireless communication system, comprising:
   a fastening detection means, provided for each seat of a vehicle, configured to detect whether a seat belt is fastened for each seat;
   a slave controller, provided for each seat, configured to:
      wake up through wireless communication with the vehicle;
      transmit a slave data signal comprising a buckle state detected by the fastening detection means through wireless communication; and
      switch to a sleep state after transmitting the slave data signal;
   a master controller, provided in the vehicle, configured to:
      receive and store a slave data signal wirelessly transmitted from each slave controller; and
      transmit the stored slave data signal to a system controller of the vehicle; and
   a harvesting circuit unit configured to perform energy harvesting in a process in which:
      the master controller is configured to wirelessly transmit a harvesting signal; and
      each slave controller is configured to receive the harvesting signal,
   wherein the harvesting circuit unit comprises:
   a harvesting-only circuit configured to:
      transmit or receive a harvesting signal between the master controller and the slave controller; and
      convert the harvesting signal into electrical energy; and
   a harvesting circuit configured to:
      transmit or receive a harvesting signal between the master controller and the slave controller; and
      convert the harvesting signal into electrical energy in a situation in which a slave data signal and an acknowledgement signal are not transmitted or received between the master controller and the slave controller.

2. The seat belt wireless communication system according to claim 1, wherein the slave controller, when in the sleep state, is configured to:
   wirelessly receive a wake-up signal; and
   switch to a wake-up state.

3. The seat belt wireless communication system according to claim 2, wherein the wake-up signal is configured to be received:
   when ignition is on;
   when a buckle is fastened or released in an ignition-on state;
   when vibration of the vehicle is sensed by a vibration sensing means; and
   when a predetermined period has elapsed in the ignition-on state.

4. The seat belt wireless communication system according to claim 3, wherein:
   the slave controller is configured to be initialized after receiving the wake-up signal; and
   when initialization is successful, each slave controller is configured to transmit a slave data signal.

5. The seat belt wireless communication system according to claim 1, wherein the slave data signal related to the buckle state is a signal related to a fastening state of the buckle and a failure state of the buckle.

6. The seat belt wireless communication system according to claim 1, wherein the slave data signal further comprises:
   a signal related to a state of a battery built in the slave controller; and
   a signal related to a failure state of each slave controller.

7. The seat belt wireless communication system according to claim 1, wherein, when the master controller receives the slave data signal, the slave controller is configured to switch to the sleep state.

8. The seat belt wireless communication system according to claim 1, wherein, when a wake-up signal received by the slave controller is a wake-up signal reflecting an ignition-on state or a fastening state of a buckle:
   a wake-up signal transmission timer of the slave controller is configured to be turned on; and
   the slave controller is then configured to switch to the sleep state.

9. The seat belt wireless communication system according to claim 1, wherein:
   when the master controller fails to receive the slave data signal, the slave controller is configured to retransmit the slave data signal; and
   when a number of retransmissions exceeds a predetermined number of times, the slave controller is configured to switch to the sleep state.

10. The seat belt wireless communication system according to claim 1, wherein, when the master controller receives the slave data signal, the master controller is configured to wirelessly transmit the acknowledgement signal to the slave controller.

11. The seat belt wireless communication system according to claim 1, wherein:
    the harvesting signals received by the harvesting-only circuit and the harvesting circuit have different frequency bands, and
    the harvesting signal and the acknowledgment signal received by the harvesting circuit have the same frequency band.

12. The seat belt wireless communication system according to claim 1, further comprising:
    an antenna configured to receive two or more signals transmitted from the master controller;
    a first matching circuit, provided in the harvesting-only circuit, configured to receive a signal for only harvesting among signals received by the antenna; and
    a second matching circuit, provided in the harvesting circuit, configured to receive a signal for harvesting and wireless communication among the signals received by the antenna.

13. The seat belt wireless communication system according to claim 1, further comprising:
    a charging unit configured to charge a battery by combining electrical energy converted through the harvesting-only circuit and electrical energy converted through the harvesting circuit;
    a receiver configured to receive the acknowledgment signal transmitted from the master controller through the harvesting circuit; and
    a switch means configured to control a signal received by the harvesting circuit to be selectively induced to the charging unit or the receiver.

14. The seat belt wireless communication system according to claim 13, wherein a harvesting operation of the harvesting circuit is configured to be stopped from immediately before the slave controller transmits the slave data signal to the master controller until the acknowledgment signal is transmitted from the master controller to the slave controller.

15. A vehicle comprising a seat belt wireless communication system of claim 1.

16. A seat belt wireless communication method comprising:
    waking up each slave controller, of one or more slave controllers of a vehicle, from a sleep state, through wireless communication;
    transmitting, by each slave controller, a slave data signal comprising a buckle state signal detected by a fastening detection means, provided for each seat, through wireless communication;
    for each slave controller, switching the slave controller to a sleep state after transmitting the slave data signal;
    by a master controller:
      receiving and storing the slave data signal wirelessly transmitted from each slave controller;
      transmitting the stored slave data signal to a system controller of a vehicle; and
      wirelessly transmitting a harvesting signal; and
    by each slave controller:
      receiving the harvesting signal; and
      performing energy harvesting in a process of receiving the harvesting signal,
    wherein each slave controller comprises a harvesting circuit unit, and
    wherein the harvesting circuit unit comprises:
    a harvesting-only circuit configured to:
      transmit or receive a harvesting signal between the master controller and the slave controller; and
      convert the harvesting signal into electrical energy; and
    a harvesting circuit configured to:
      transmit or receive a harvesting signal between the master controller and the slave controller; and
      convert the harvesting signal into electrical energy in a situation in which a slave data signal and an acknowledgement signal are not transmitted or received between the master controller and the slave controller.

* * * * *